June 14, 1955 M. L. DOELZ 2,710,943
MECHANICAL SQUELCH SYSTEM
Filed Aug. 14, 1953 2 Sheets-Sheet 1

INVENTOR.
MELVIN L. DOELZ
BY Marvin Moody
ATTORNEY

INVENTOR.
MELVIN L. DOELZ
BY Marvin Moody
ATTORNEY

United States Patent Office 2,710,943

Patented June 14, 1955

2,710,943

MECHANICAL SQUELCH SYSTEM

Melvin L. Doelz, Glendale, Calif., assignor to Collins Radio Company, Cedar Rapids, Iowa, a corporation of Iowa Application August 14, 1953, Serial No. 374,406

10 Claims. (Cl. 333—12)

This invention relates in general to a mechanical squelch system and in particular to apparatus for producing an output signal when a repetitive type input signal is received and which ignores non-repetitive type signals such as noise.

In electronic communications certain amounts of noise occur which interfere and tend to make the desired signal unintelligible.

It is an object of this invention therefore to provide a mechanical squelch system which distinguishes between a repetitive type signal and a signal which has no repetitive characteristics.

It is another object of this invention to provide a mechanical squelch system which receives an incoming signal, delays a portion of this signal and supplies it to a mechanical multiplying and integrating device so as to produce an output if the input signal is of repetitive nature and to produce no output if the incoming signal has no repetitive characteristics.

It is yet another object of this invention to filter and remove signals of non-repetitive character.

A feature of this invention is found in the provision for a delay device that receives a portion of an incoming signal and feeds it to the multiplying and integrating means along with the undelayed signal so that an output may be produced if the incoming signal has a repetitive characteristic and no output signal will be produced if the incoming signal is random in nature.

Further features, objects and advantages of this invention will become apparent from the following description and claims when read in view of the drawings, in which:

Figure 1:
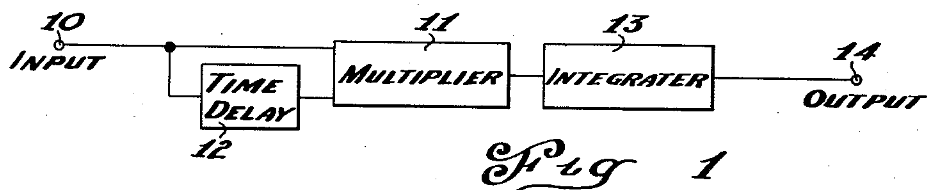
Figure 1 illustrates the general structure of a system for sensing repetitive signals.

Figure 1 illustrates an input terminal 10 which is connected to a multiplier 11. A time delay device 12 receives a portion of the input signal and supplies an output to the multiplier 11. The multiplier 11 multiplies the undelayed and the delayed signals and passes the product to an integrating circuit 13 which has its output connected to an output terminal 14.

If the input signal supplied to the terminal 10 has a repetitive character, such as a sine wave, for example, an output will be produced at terminal 14. However, if the signal supplied to terminal 10 is random in nature and has no repetitive characteristics, the product of the undelayed and the delayed wave will average zero and no output will occur at terminal 14.

Thus, means are provided for separating a signal of repetitive characteristics from one of non-repetitive characteristic. Since most intelligence is carried in a repetitive type wave, it allows intelligence to pass but eliminates noise.

To understand why a repetitive type signal passes through the device while a non-repetitive one does not, the following equations may be considered. Let it be assumed that an input signal of the general form "cos $\omega t$" is supplied to the terminal 10 and that the time delay 12 is equal to an angle $\phi$.

The multiplier 11 therefore multiplies together "cos $\omega t$" and "cos $(\omega t+\phi)$".

$$(1)\quad (\cos \omega t) \cos (\omega t+\phi)=$$

$$(\cos \omega t)(\cos \omega t \cos \phi - \sin \omega t \sin \phi)=$$

$$\cos^2 \omega t \cos \phi - \sin \omega t \cos \omega t \sin \phi$$

The term "$\cos^2 \omega t \cos \phi$" may be written "$\frac{1}{2}(1+\cos 2\omega t) \cos \phi$" which includes a term $$\frac{\cos \phi}{2}$$

Since $\phi$ is the time delay of the unit 12 and is constant, the integrated output will contain a direct current component. The cosine and sine terms of $\omega t$ integrate out to zero. It is therefore seen that only repetitive type waves produce an output at the terminal 14.

Figure 2:
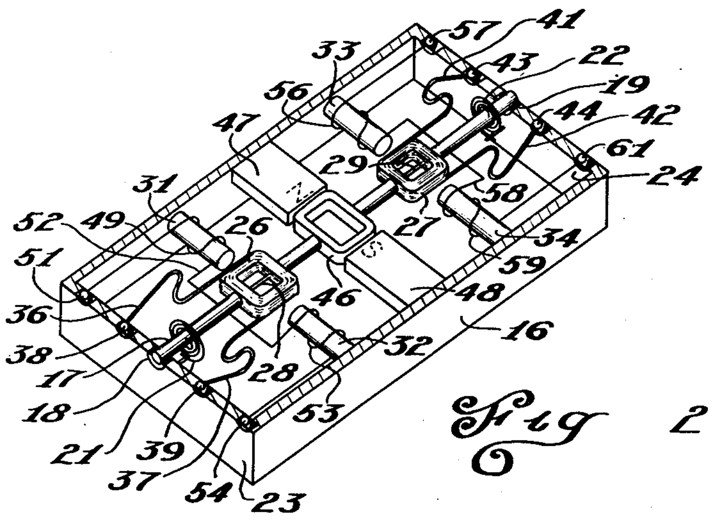
Figure 2 illustrates a particular mechanical multiplier and integrater device.

Figure 2 illustrates applicant's structure for multipling the delayed and undelayed wave and for integrating their product. A mechanical rotor due to its inertia accomplishes the integration, and multiplication is done by utilizing moving coils between the magnets.

A supporting case 16 rotatably supports a shaft 17 which is suitably supported in bearings 18 and 19. Biasing springs 21 and 22 are connected between the end plates 23 and 24 and the shaft 17 to bias it to a zero position.

A pair of coils 26 and 27 are mounted on the shaft 17 and the portions of the shaft 17 which pass through their center are decreased in diameter and are designated by numerals 28 and 29.

A first pair of pole pieces 31 and 32 are supported by the frame 16 and extend from opposite sides inwardly toward the coil 26.

A second pair of pole pieces 33 and 34 are attached to the frame 16 and extend inwardly toward the coil 27.

Coil 26 is wound as shown and has output leads 36 and 37 that connect to suitable terminals 38 and 39 on the frame 16.

In similar fashion the coil 27 has suitable leads 41 and 42 which connect to terminals 43 and 44 on the frame. It is to be realized that the terminals are insulated from the frame.

Between the coils 26 and 27 is mounted a conducting ring 46 which might be made of aluminum and which is integrally formed with the shaft 17. It is mounted between a third pair of pole pieces 47 and 48 which extend inwardly from the frame 16.

The pole piece 31 has a winding 49 which has one end connected to a terminal 51 and its other end is connected by a lead 52 to a winding 53 about the pole piece 32. The winding 53 has its other end connected to an insulating terminal 54 on the frame 16.

A winding 56 is wound about the pole piece 33 and has one end connected to the insulating terminal 57 and is connected by a lead 58 to a winding 59 which has its opposite end connected to a terminal 61 on the supporting frame 16.

Figure 3:
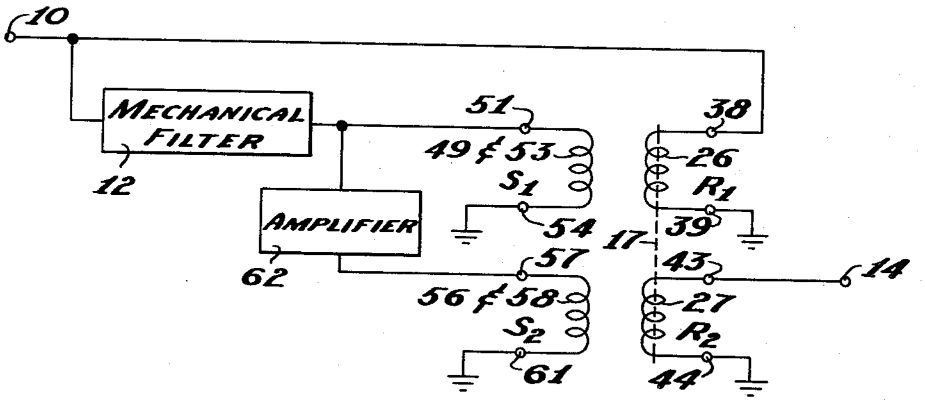
Figure 3 is a schematic view.

Figure 3 illustrates schematically the apparatus shown in Figure 2 connected in the circuit of Figure 1 to accomplish the multiplying and integrating functions. The windings 26 and 27 are mechanically coupled together by the shaft 17 as shown.

The input signal from terminal 10 is connected directly to the contact 38 which is connected to the movable coil 26. The opposite end of the coil 26 is connected to terminal 39 which is grounded. The output terminal 14 is connected to contact 43 which is connected to one end of the second movable coil 27. The other end of coil 27 is connected to terminal 44 which is grounded.

The time delay 12 may be a mechanical filter such as described in patent applications Ser. Nos. 248,011 and 284,082, filed September 24, 1951, and April 24, 1952, respectively. The output of the time delay device is connected to terminal 51 which connects to the coils 49 and 53 in series. The contact 54 is connected to ground.

An amplifier 62 also receives the output of the time delay device 12 so as to isolate the inputs to the different coils. The output of the amplifier 62 is connected to terminal 57 which is in turn connected to coils 56 and 58. The terminal 61 is connected to ground.

The pole pieces and the movable coils 26 and 27 are similar to a watt meter movement with the undelayed input being connected to the movable coil 26 and the output removed from the movable coil 27. The delayed input signal is supplied to the various stationary coils.

When a repetitive type signal is applied to coil 26 and the stationary coils 49 and 53, coil 26 will move relative to the pole pieces 31 and 32. This movement will occur against the springs 21 and 22 and will cause an induced voltage in the winding 27 when it is moved from the zero position in line with the pole pieces 33 and 34. This induced voltage will be indicated at the output terminal 14.

The inertia of the shaft 17, the coils 26 and 27, and the damping ring 46 will integrate the output signal because of the mechanical inertia. Thus, extremely rapid fluctuations will be eliminated and the output will be integated.

Figure 4:
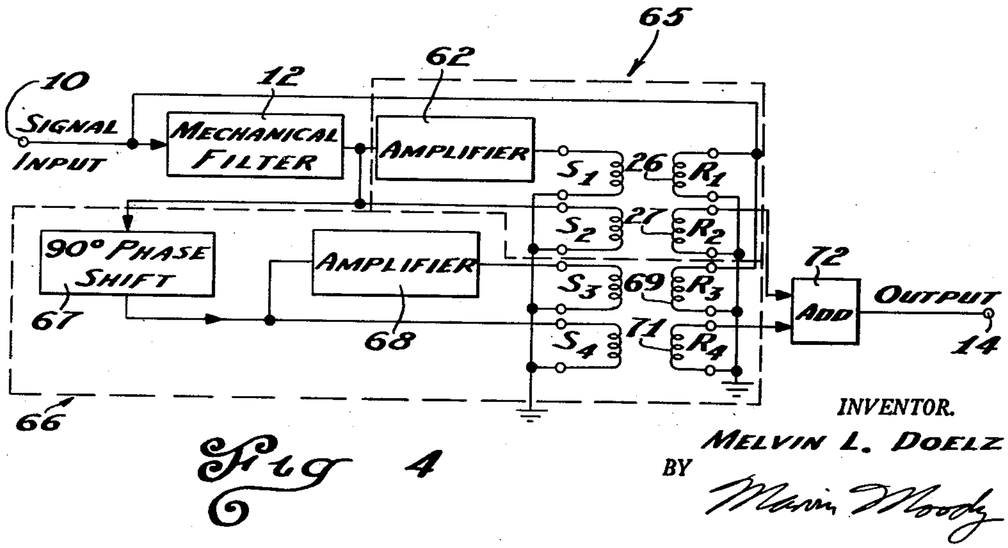
Figure 4 illustrates a modification of the invention.

Under certain conditions the time delay caused by the mechanical filter will produce phase shifts such that at certain frequencies there will be no rotation even in the presence of a signal. To eliminate this condition a second unit according to Figure 3 may be added and combined with a ninety degree phase shift circuit 67. This is shown in Figure 4 wherein the first unit is designated as 66 and the second unit as 65.

A ninety degree phase shift circuit 67 is connected to the output of the time delay 12 which may be a mechanical filter and its output is fed into a second pair of stationary coils designated as $S_3$ and $S_4$, and which correspond to the stationary coils $S_1$ and $S_2$ in the first squelch unit. An amplifier 68 isolates coils $S_3$ and $S_4$. The undelayed signal is fed in parallel to the movable coil 26 which is indicated as $R_1$ and the first movable coil of the second squelch unit which is indicated as 69. The second movable coil of the second squelch unit is designated as 71 and its output is added in the adding circuit 72 with the output of the coil 27. The output is furnished to the output terminal 14.

The damping ring 46 and springs 21 and 22 center the shaft 17 and dampen oscillations.

It is to be particularly noted that the mechanical filters shown and described in patent applications Serial Numbers 248,011 and 284,082, are very good time delay devices at these frequencies, which might be, for example, 455 kilocycles.

It is seen that this invention provides means for detecting a repetitive type signal, and although it has been described with respect to particular embodiments thereof, it is not to be so limited as changes and modifications may be made therein which are within the full intended scope of the invention.

I claim:

1. Means for separating a repetitive type signal from a non-repetitive type signal comprising, an input terminal, a time delay device with its input connected to the input terminal, a multiplier connected to the output of the time delay device and to the input terminal, an integrator connected to the output of the multiplier, and an output terminal connected to the integrator and the multiplier multiplying the input signal by the delayed input signal from the time delay device.

2. Means for separating a repetitive and a non-repetitive type signal comprising, an in put terminal, a mechanical filter with its input connected to said input terminal and delaying the input signal, a multiplier connected to said input terminal and to the output of said mechanical filter, an integrator receiving the output of the multiplier, and an output terminal connected to said integrator and said multiplier multiplying the input signal by the delayed input signal from the mechanical filter.

3. A mechanical squelch system for separating a repetitive and a non repetitive type signal comprising, an input terminal, a support means, a shaft rotatably supported in said support means, a pair of windings mounted on said shaft, a first pair of pole pieces mounted on said supporting means and extending toward said first coil, a second pair of pole pieces mounted adjacent the second coil and supported by said supporting means, a delay device with its input connected to said input terminal, a first stationary coil mounted about the first pair of pole pieces, a second stationary coil wound about the second pair of pole pieces, the output of the delay device connected to the first sides of the first and second stationary coils and the other sides connected to ground, the first of said pair of windings mounted on said shaft connected to the input terminal and the second winding mounted on the shaft connected to an output terminal.

4. A mechanical squelch system for separating a repetitive and a non-repetitive type signal comprising, an input terminal, a support means, a shaft rotatably supported in said support means, a pair of coils mounted on said shaft, a first pair of pole pieces mounted on said supporting means and extending adjacent said first coil, a second pair of pole pieces mounted adjacent the second coil and supported by said supporting means, a delay device with its input connected to said input terminal, a first stationary coil mounted about the first pair of pole pieces, a second stationary coil wound about the second pair of pole pieces, the output of the delay device connected to first sides of the first and second stationary windings and their second sides connected to ground, the first coil mounted on said shaft connected to the input terminal, the second coil mounted on the supporting shaft connected to an output terminal, a pair of permanent magnets mounted to the supporting means and extending toward the center, and a conducting damping ring mounted on the shaft between said permanent magnets.

5. A mechanical squelch system for separating a repetitive and a non-repetitive type signal comprising, an input terminal, a support means, a shaft rotatably supported in said support means, a pair of coils mounted on said shaft, spring biasing means connected between said supporting means and said shaft so as to bias it to a zero position, a first pair of pole pieces mounted on said supporting means and extending toward said first coil, a second pair of pole pieces mounted adjacent the second coil and supported by said supporting means, a mechanical filter with its input connected to said input terminal, a first stationary coil mounted about the first pair of pole pieces, a second stationary coil wound about the second pair of pole pieces, the output of the mechanical filter connected to first sides of the first and second stationary coils, and the second sides of said coils connected to ground, the first coil mounted on said shaft connected to the input terminal, the second coil mounted on the supporting shaft connected to an output terminal, a pair of permanent magnets mounted to the supporting means and extending in toward the shaft and a conducting damping ring mounted in the shaft between said permanent pole pieces.

6. A mechanical squelch system for separating a repetitive from a non-repetitive type signal comprising, an input terminal, a mechanical filter receiving an input from the input terminal, a mechanical multiplier and integrator having a supporting member, a shaft rotatably supported by said supporting member, first, second and third pairs of pole pieces connected to the supporting member and extending inwardly toward said shaft, a pair of rotating coils mounted on said shaft between the first and second pair of pole pieces, respectively, a dampening ring of conducting material mounted on said shaft between the third pair of pole pieces, a first stationary coil wound about the first pair of pole pieces, a second stationary coil wound about the second pair of pole pieces, the output of the mechanical filter connected in parallel to the first and second stationary coils, the first rotatable coil connected to the input terminal, and an output terminal connected to the second rotatable coil.

7. A mechanical squelch system for separating a repetitive from a non-repetitive type signal comprising, an input terminal, a mechanical filter receiving an input from the input terminal, a mechanical multiplier and integrator having a supporting member, a shaft rotatably supported by said supporting member, first, second and third pairs of pole pieces connected to the supporting member and extending inwardly toward said shaft, a pair of rotating coils mounted on said shaft between the first and second pair of pole pieces, respectively, a dampening ring of conducting material mounted on said shaft between the third pair of pole pieces, a first stationary coil wound about the first pair of pole pieces, a second stationary coil wound about the second pair of pole pieces, the output of the mechanical filter connected in parallel to the first and second stationary coils, the first rotatable coil connected to the input terminal, an output terminal connected to the second rotatable coil, and spring biasing means connected from the supporting means to the shaft.

8. A mechanical squelch system for separating a repetitive from a non-repetitive type signal comprising, an input terminal, a mechanical filter receiving an input from the input terminal, a mechanical multiplier and integrator having a supporting member, a shaft rotatably supported by said supporting member, first, second and third pairs of pole pieces connected to the supporting member and extending inwardly toward said shaft, a pair of rotatable coils mounted on said shaft between the first and second pair of pole pieces, respectively, a dampening ring of conducting material mounted on said shaft between the third pair of pole pieces, a first stationary coil wound about the first pair of pole pieces, a second stationary coil wound about the second pair of pole pieces, the output of the mechanical filter connected to the first stationary coil, an amplifier connected between the mechanical filter and the second stationary coil, the first rotatable coil connected to the input terminal, and an output terminal connected to the second rotatable coil.

9. Means for separating a repetitive and non-repetitive type signal comprising, an input terminal, a delay device connected to the input terminal, a ninety degree phase shift circuit receiving the output of the delay device, a pair of multiplier-integrators according to claim 6 with the stationary coils of the first multiplier-integrator connected in parallel to the output of the delay device and the stationary coils of the second multiplier and integrator connected in parallel to the output of the ninety degree phase shift circuit, the first movable coils of the first and second multiplier-integrators connected in parallel to the input terminal, an adding circuit connected to the second movable coils of the first and second multiplier-integrators, and an output terminal connected to the adding circuit.

10. Means for separating a repetitive and a non-repetitive type signal comprising, an input terminal, a mechanical filter connected to the input terminal, a ninety degree phase shift circuit receiving the output of the mechanical filter, a pair of multiplier-integrators according to claim 6 with one of the stationary coils of the first multiplier-integrator connected to the output of the mechanical filter, a first amplifier connected between the mechanical filter and the other stationary coil of the first multiplier-integrator, and one of the stationary coils of the second multiplier and integrator connected to the output of the ninety degree phase shift circuit, a second amplifier connected between the ninety degree phase shift circuit and the second stationary coil of the second multiplier-integrator, the first movable coils of the first and second multiplier-integrators connected to the input terminal, an adding circuit connected to the second movable coils of the first and second multiplier-integrators, and an output terminal connected to the adding circuit.

No references cited.